United States Patent [19]
Marzio et al.

[11] Patent Number: 5,927,152
[45] Date of Patent: Jul. 27, 1999

[54] DEVICE FOR PREVENTING ROTATION OF STEERING COLUMN BODY OF AN AUTOMOBILE VEHICLE

[75] Inventors: Emmanuel Marzio; Benoît Duval, both of Vendome; André Laisement, La Chapelle Encherie, all of France

[73] Assignee: Lemförder Nacam, Vendome, France

[21] Appl. No.: 08/811,944

[22] Filed: Mar. 5, 1997

[30] Foreign Application Priority Data

Mar. 6, 1996 [FR] France ................................... 96 03010

[51] Int. Cl.⁶ ..................................................... B62D 1/18
[52] U.S. Cl. ............................ 74/493; 74/531; 280/775; 280/779
[58] Field of Search ..................... 74/531, 493; 280/779, 280/775, 777

[56] References Cited

U.S. PATENT DOCUMENTS

| | | | |
|---|---|---|---|
| 4,046,024 | 9/1977 | Broucksou | 74/493 |
| 5,117,707 | 6/1992 | Kinoshita et al. | 74/493 |
| 5,392,667 | 2/1995 | Courvoisier | 74/493 |
| 5,524,927 | 6/1996 | Toussaint | 280/777 |
| 5,655,413 | 8/1997 | Barton | 74/493 |
| 5,722,299 | 3/1998 | Yamamoto et al. | 74/493 |
| 5,743,150 | 4/1998 | Fevre et al. | 74/493 |
| 5,761,966 | 6/1998 | Cuiller et al. | 74/493 |

FOREIGN PATENT DOCUMENTS 2113629  8/1983  United Kingdom ..................... 74/493

Primary Examiner—John A. Jeffery
Assistant Examiner—William C. Joyce
Attorney, Agent, or Firm—Laubscher & Laubscher

[57] ABSTRACT

A device for preventing rotation of the steering column body of an automobile vehicle comprising a support member attached to the chassis of the vehicle and a body which is held in position relative to the support member by a locking system. For the adjustment of the steering column concerned in the required direction at least one pair of coupling surfaces is joined to the support member and cooperate with a pair of coupling surfaces joined to the body. The coupling surfaces have a direction substantially parallel to the required adjustment direction and are angularly oriented with respect to major faces of the support member and the body, so that the coupling surfaces cooperate with each other upon locking in order to prevent rotation of the steering column body.

8 Claims, 5 Drawing Sheets

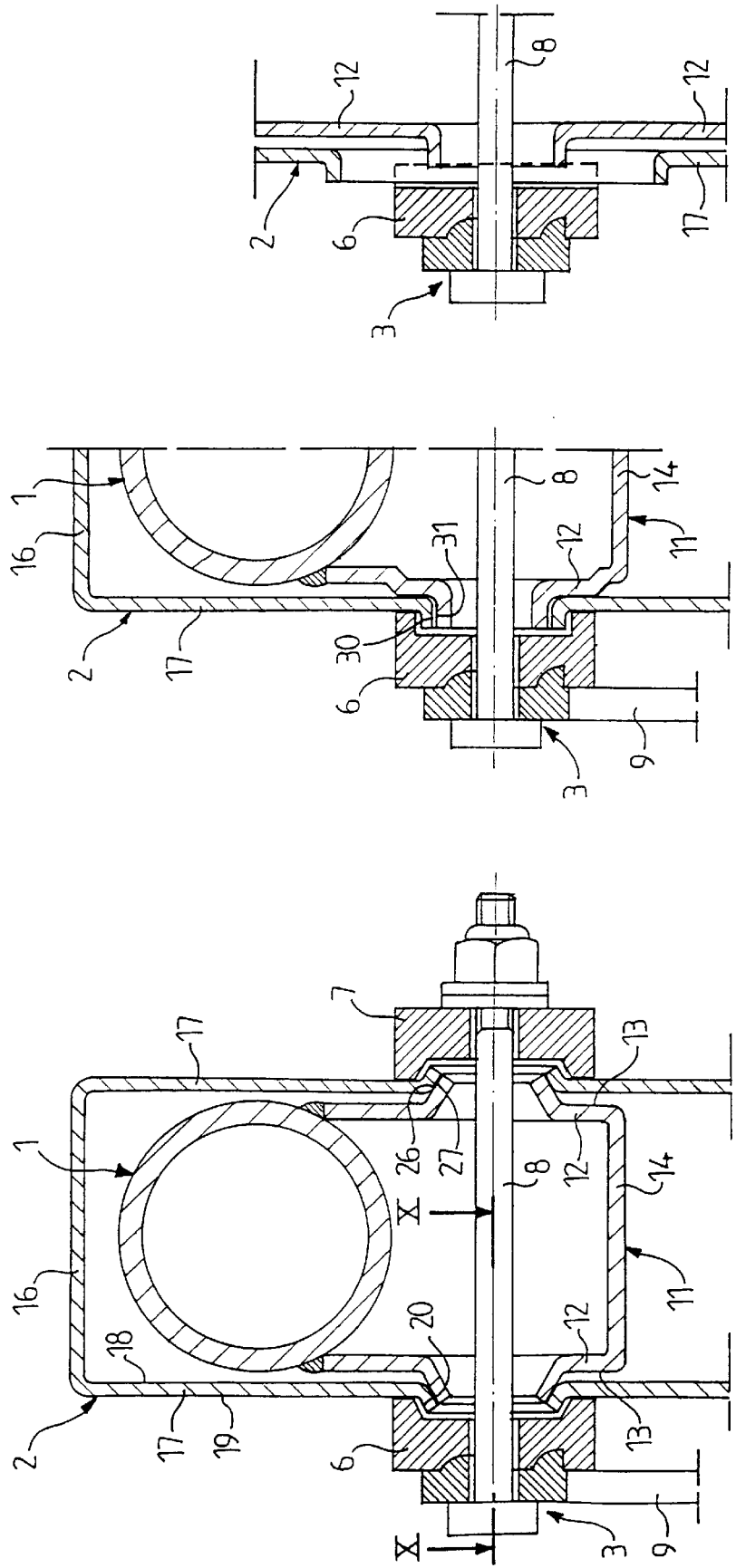

DEVICE FOR PREVENTING ROTATION OF STEERING COLUMN BODY OF AN AUTOMOBILE VEHICLE

BACKGROUND OF THE INVENTION

1. Field of the Invention

The present invention concerns a device for preventing rotation of the steering column of an automobile vehicle.

2. Description of the Prior Art

The increasingly severe requirements for protection of the driver in the event of an accident and in particular in the event of a head-on impact have led manufacturers to provide a safety air cushion system, usually called an "air-bag", which inflates almost instantaneously upon impact to protect the driver by covering the steering wheel. The new safety standards require the ability to withstand a greater speed on impact while simultaneously guaranteeing a reduced force on the driver or the passenger. For this reason, new air-bags must be larger, with the result that the point of contact of the driver with the air-bag in the event of an impact is more off-center, which causes a higher torque and transverse forces which are higher. It is therefore necessary to prevent any rotation of the body of the steering column in the event of a head-on impact. Moreover, it is necessary to avoid any feeling of clearance at the steering wheel if the driver presses on the steering wheel in a vertical direction, giving the driver an unsafe impression.

OBJECT OF THE INVENTION

The main object of this invention is to provide a device for preventing rotation of the body of the steering column which stops all rotation of the steering column body during a head-on impact, or prevents any feeling of clearance when the driver presses on the steering wheel, with provision for a system of accommodating torque and taking up clearance in the event of a head-on impact or application of force by the driver.

SUMMARY OF THE INVENTION

According to the invention, a device for preventing rotation of the steering column body of an automobile vehicle comprises a support member attached to a chassis of the vehicle, and a body which is held in position relative to the support member by means of a locking system. The device of the invention further comprises a means for adjusting the steering column in a required adjustment direction. The adjusting means comprises at least one pair of coupling surfaces joined to the support member and one pair of coupling surfaces joined to the body and cooperating with the pair of coupling surfaces joined to the support member. The coupling surfaces have a direction substantially parallel to the required adjustment direction and are oriented with respect to major faces of the support member and body so that the pairs of coupling surfaces cooperate together upon locking in order to prevent rotation of the steering column body, the pairs of coupling surfaces remaining engaged with each other upon unlocking.

The coupling surfaces can be angularly oriented with respect to the major faces of the support member and body, or substantially perpendicular to the major faces of the support member and body.

Advantageously according to an embodiment of the invention, the device comprises an intermediate member which is disposed between a flange of the support member and one respective face of the body for adjusting the steering column in the required adjustment direction. The intermediate member has on an inside face on the same side as the body a pair of coupling surfaces cooperating with a pair of coupling surfaces on the body, the coupling surfaces on the body being oriented in a direction of depthwise adjustment. The intermediate member has on an outside face on the same side as the support member a pair of coupling surfaces cooperating with a pair of coupling surfaces on the support member, the coupling surfaces on the support member being oriented in a direction of heightwise adjustment.

According to another embodiment of the invention, the device comprises an intermediate member which is disposed between a flange of the support member and one respective face of the body for adjusting the steering column in the required adjustment direction. The intermediate member has on an inside face on the same side as the body a pair of coupling surfaces cooperating with a pair of coupling surfaces on the body, the coupling surfaces on the body being oriented in a direction of heightwise adjustment. The intermediate member has on an outside face on the same side as the support member a pair of coupling surfaces cooperating with a pair of coupling surfaces on the support member, the coupling surfaces on the support member being oriented in a direction of depthwise adjustment.

According to embodiments of the invention, in each pair of coupling surfaces, the coupling surfaces are parallel to each other. In other embodiments, in each pair of coupling surfaces, the coupling surfaces are inclined symmetrically to each other.

In order to more improve the set for preventing rotation in the device, the device includes at least one facing member for a set of pairs of coupling surfaces. This facing member is disposed on an axle of the locking system and outside a corresponding outside face of the support member and is applied directly against an outside part of the pairs of the coupling surfaces. In another variant of embodiment of the invention, the device comprises at least one facing member for the pairs of coupling surfaces. This facing member is disposed on the axle of the locking system and outside a corresponding outside face of the support member and is applied directly against said outside face of the support member.

In order to further improve the security of the device for preventing rotation according to the invention, the intermediate member has two abutments integral with the inside or outside face in accordance with the desired embodiment, having said coupling surfaces oriented in the direction of the depthwise adjustment.

In the case of a steering column with unidirectional axial or depthwise adjustment, the device of the invention may consist in either of the following two embodiments.

In a first embodiment, the antirotation device has a support member of the U-shape with two flanges. Each flange has a pair of coupling surfaces which are angularly oriented and cooperate with the other pair of angularly oriented coupling surfaces on the respective lateral portion of the reinforcing square of the body. The coupling surfaces are oriented in the direction of the depthwise adjustment, and a facing member is disposed outside the outside face of the respective flanges of the support member.

In a second embodiment, each flange of the U-shape support member has a pair of coupling surfaces which are perpendicular to the respective flange and cooperate with a pair of coupling surfaces perpendicular to and belonging to the respective lateral portion of the reinforcing square of the body. The coupling surfaces are oriented in the direction of the heightwise adjustment, and a facing member being disposed outside the outside face of each of the respective flange of the support member.

In the case of a steering column with unidirectional angular or heightwise adjustment, there may be two embodiments of the invention.

According to a first embodiment, the antirotation device has a flange of the U-shape support member which has a pair of coupling surfaces which are angularly oriented and cooperate with a pair of angularly oriented coupling surfaces on the respective lateral portion of the reinforcing square of the body. The coupling surfaces are oriented in the direction of the depthwise adjustment, and a facing member is disposed outside the outside face of the respective flange of the support member.

In a second embodiment, a flange of the U-shape support has a pair of coupling surfaces which are perpendicular to the corresponding flange and which cooperate with a pair of coupling surfaces perpendicular and belonging to the respective lateral member of the reinforcing square of the body. The coupling surfaces are oriented in the direction of the heightwise adjustment, and a facing member is disposed outside the outside face of the respective flange of the support member.

If the steering column is adjustable in two directions, i.e. in the axial or depthwise direction and also in the angular or heightwise direction, there may be two embodiments of the invention.

In a first embodiment, the steering column body rotation preventing device comprises two intermediate members which are each disposed between respective one of the flanges and an outside face of one respective of the lateral portions of the renforcing member. On an inside face of each intermediate member on the same side as the body are provided first two coupling surfaces cooperating with second two coupling surfaces on the respective lateral portion of the renforcing member, the first two coupling surfaces and second two coupling surfaces being angularly oriented with respect to the respective lateral portion in a direction of depthwise adjustment, and also two abutments integral with the inside face. On an outside face of each intermediate member on the same side as the support member are provided third two coupling surfaces cooperating with fourth two coupling surfaces on the respective lateral flange of the support member, the third two coupling surfaces and fourth two coupling surfaces being angularly oriented with respect to the respective lateral flange in a direction of heightwise adjustment. Each intermediate member further comprises two facing members disposed outside inside faces of the lateral flanges of the support member.

In a second embodiment, the steering column body rotation preventing device comprises two intermediate members which are each disposed between respective one of the flanges and an outside face of one respective of the lateral portions of the renforcing member. On an inside face of each intermediate member on the same side as the body are provided first two coupling surfaces cooperating with second two coupling surfaces on the respective lateral portion of the renforcing member, the first two coupling surfaces and second two coupling surfaces being perpendicular to the respective lateral portion and oriented in a direction of depthwise adjustment, and also two abutments integral with the inside face. On an outside face of each intermediate member on the same side as the support member are provided third two coupling surfaces cooperating with fourth two coupling surfaces on the respective lateral flange of the support member, the third two coupling surfaces and fourth two coupling surfaces being perpendicular to the respective lateral flange and oriented in a direction of heightwise adjustment. Each intermediate member further comprises two facing members disposed outside inside faces of the lateral flanges of the support member.

The system of the invention for preventing rotation of the steering column body has thus the advantage of stopping rotation of the steering column body during a head-on impact that complies with the new standards and with the use of the new, larger diameter air-bags. It is also guaranteed to avoid any feeling of clearance at the steering wheel when the driver applies a force to the steering wheel in a vertical direction.

BRIEF DESCRIPTION OF THE DRAWINGS

Further features and advantages of the invention will be apparent from the following particular description of several preferred embodiments of the invention as illustrated in the corresponding accompanying drawings in which:

FIG. 8 is a cross-sectional view similar to FIG. 1 of another embodiment of the invention;

FIG. 9 repeats part of FIG. 8 for a different embodiment;

FIG. 10 is a cross-sectional view taken along the line X—X in FIG. 8;

DESCRIPTION OF THE PREFERRED EMBODIMENTS

Figure 2:
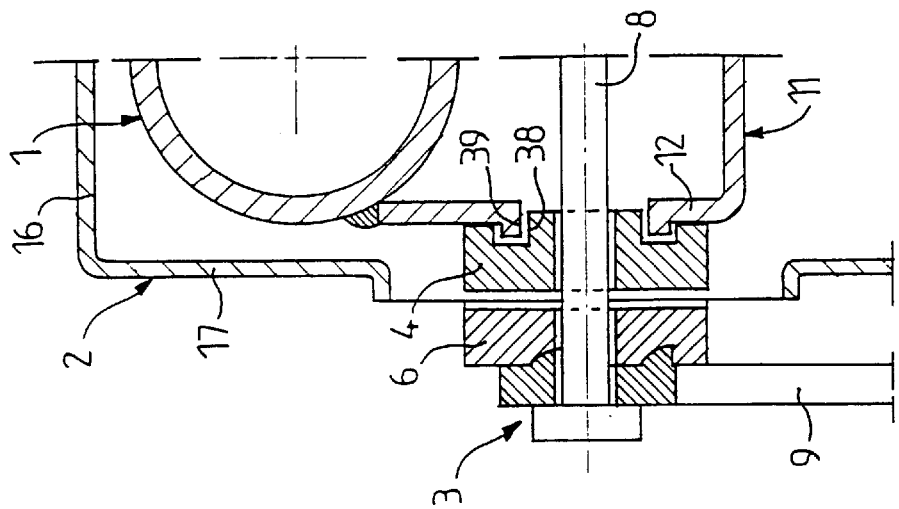
FIG. 2 repeats part of FIG. 1 for a different embodiment.

As can be seen in the various figures, the device in accordance with the invention for preventing rotation of the steering column body includes a support member 2 attached to the chassis of the vehicle, and a body 1. The body 1 is held in position relative to the support member 2 by means of a locking system 3. This locking system essentially comprises a locking pin 8 which is operated by a handle 9.

For adjustment of concerned steering columns in the required direction, i.e. for the axial or depthwise adjustment or for the angular vertical or heightwise adjustment, the antirotation device includes at least one pair of coupling surfaces joined to the support member which cooperate with a pair of coupling surfaces joined to the body. The coupling surfaces, for example the surfaces 26 and 27 in FIG. 8, are substantially parallel to the required adjustment direction and are inclined. The coupling surfaces, for example the surfaces 30 and 31 in FIG. 9, are substantially parallel to the required adjustment direction, and are substantially perpendicular to a corresponding major face 18 of the support member 2 and a corresponding major face 13 of the body 1 respectively. The various embodiments of the invention are constructed so that the coupling surfaces, for example the surfaces 26, 27 or the surfaces 30, 31, cooperate with each other upon locking in order to prevent rotation of the steering column body.

In the embodiments of the invention shown in FIGS. 1 through 7 the antirotation device includes an intermediate member 4, 5 disposed between the flange of the support member 2 and the corresponding major face 13 of the body 1. The intermediate member 4, 5 has on the inside face 21 (FIG. 6) on the same side as the body 1 two coupling surfaces 34 which cooperate with two coupling surfaces 35 on said body 1. The coupling surfaces 34 and 35 are oriented in the direction of the depthwise adjustment. Furthermore, the intermediate member 4, 5 has on the outside face 22 on the same side as the support member 2 two coupling surfaces 36 which cooperate with two coupling surfaces 37 on said support member 2. The coupling surfaces 36 and 37 are oriented in the direction of the heightwise adjustment.

Figure 6:
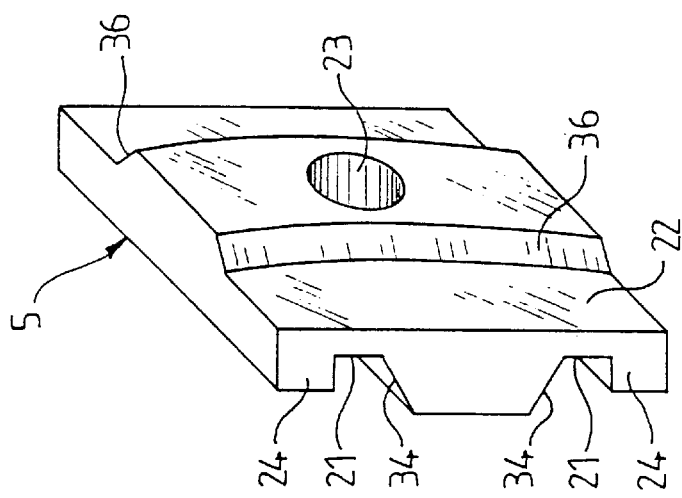
FIG. 6 is a perspective view of an intermediate member of the invention.

In a different embodiment, not shown in the figures, the antirotation device has an intermediate member 4, 5 disposed between the flange 17 of the support member 2 and the corresponding major face 13 of the body 1. Referring to FIG. 6, in this case the inside face 22 would have the coupling surfaces 36 oriented in the direction of the heightwise adjustment, and the outside face 21 would have the coupling surfaces 34 oriented in the direction of the depthwise adjustment. In this case, the antirotation device of the invention includes an intermediate member 4, 5 disposed between the flange 17 of the support member 2 and the corresponding major face 13 of the body 1. The intermediate member 4, 5 has on the inside face 22 on the same side as the body two coupling surfaces 36 cooperating with two coupling surfaces on said body. The surfaces 36 are oriented in the direction of the heightwise adjustment. The intermediate member 4 or 5 has on the outside face 21 on the same side as the support member 2 two coupling surfaces 34 which cooperate with two coupling surfaces on said support member, said coupling surfaces 34 being oriented in the direction of the depthwise adjustment.

Figure 1:
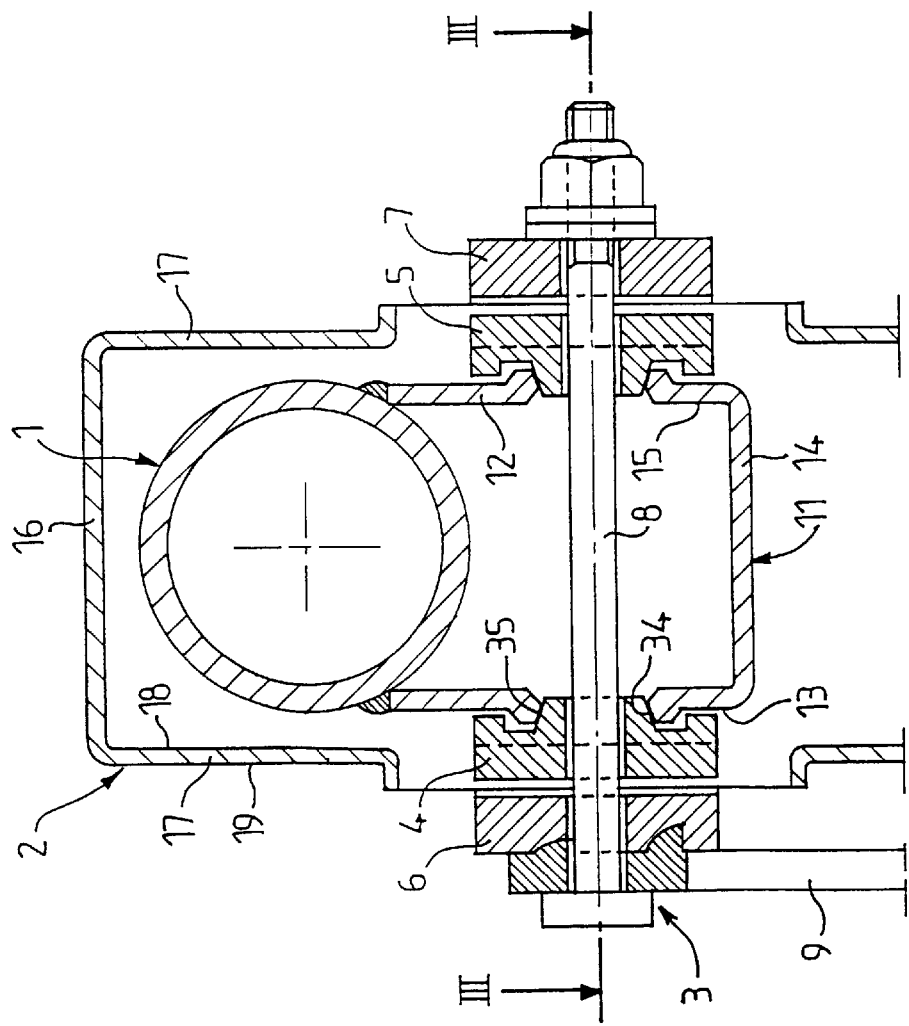
FIG. 1 is a cross sectional view of a steering column body rotation preventing device in accordance with the invention taken along the axis of a locking system.
Figure 3:
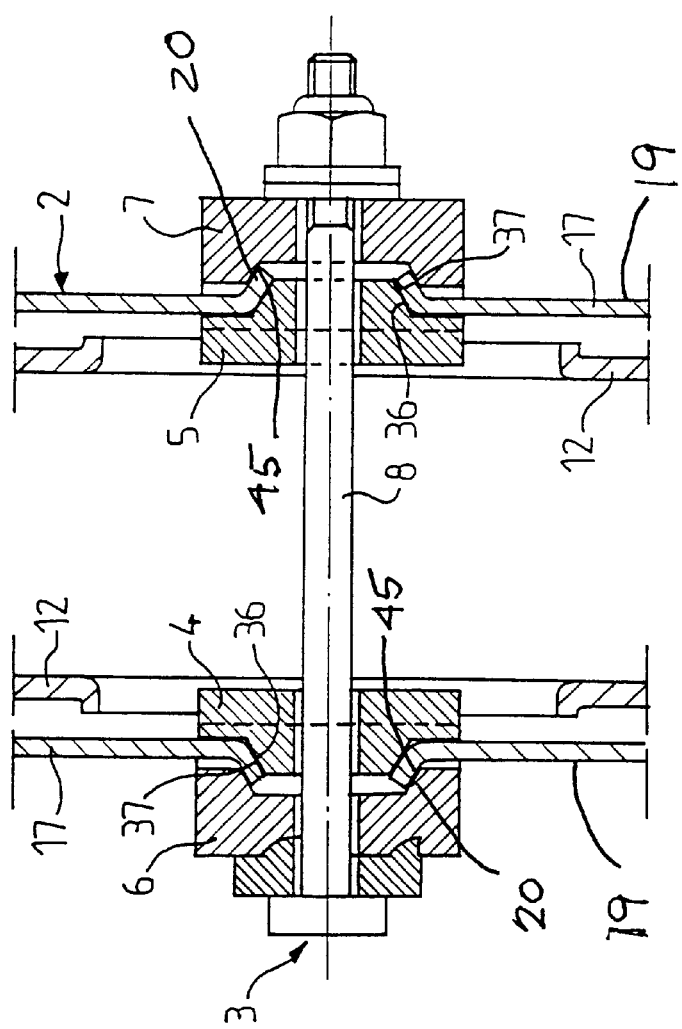
FIG. 3 is a cross-sectional view taken along the line III—III in FIG. 1.

In the embodiment shown in FIGS. 1, 3 and 6 each pair of coupling surfaces 34 and 35, and 36 and 37 has the two parallel coupling surfaces inclined symmetrically relative to each other.

Figure 4:
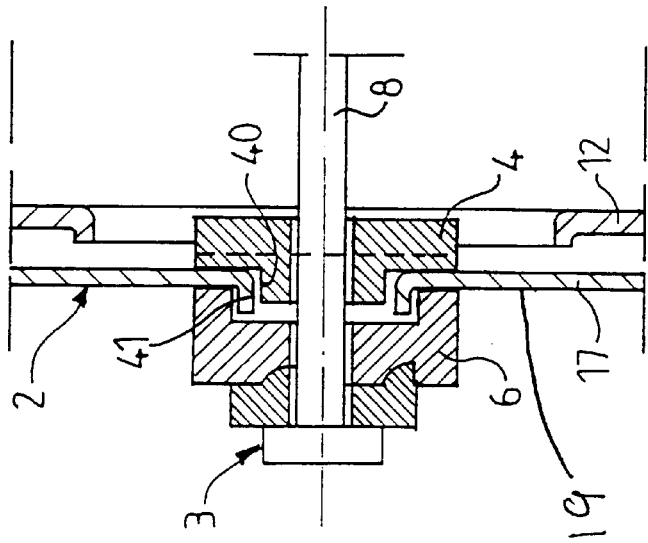
FIG. 4 repeats part of FIG. 3 for a different embodiment.

In the embodiment of FIGS. 2 and 4, each pair of coupling surfaces 38 and 39, and 40 and 41 has the two coupling surfaces parallel to each other.

Figure 7:
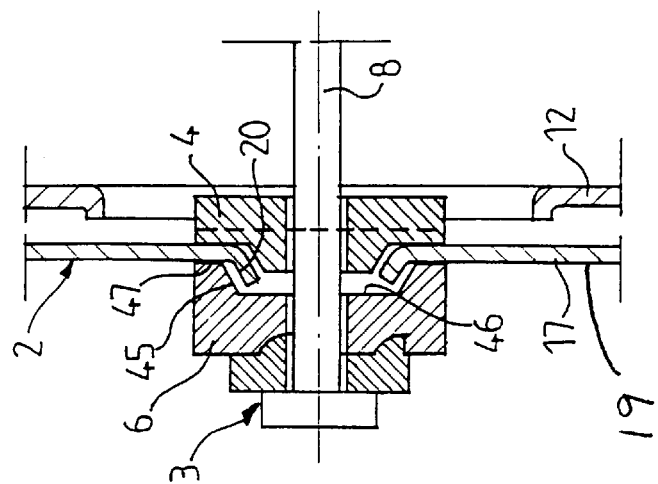
FIG. 7 shows a facing member in accordance with the invention.

Moreover, as can be seen in FIGS. 3 and 7, the device includes facing members 6 and 7 respectively arranged on the sides outside the flanges 17 of the support member 2. Each facing member 6, 7 is associated with a set of coupling surfaces 20 and 45 and is disposed on the pin 8 of the locking system 3 and outside the corresponding outside face 19 of the support member 2. Each facing member can therefore bear directly against the outside part 20 of the corresponding coupling surfaces 37 of said set.

In a different embodiment, each facing member 6, 7 for a set of coupling surfaces 36, 37 is also disposed on the axis of the antirotation system 3 and outside the outside face 19 of the corresponding flange of the support member 2, so as to bear directly against the outside major face 19 of the support member 2.

As can be seen FIGS. 1 and 6, the intermediate member further includes two abutments 24 integral with the face 21 which is provided with coupling surfaces 34 oriented in the direction of the depthwise adjustment.

In the embodiment of FIGS. 1, 3, 6 and 7 the antirotation device includes intermediate members 4 and 5 which are each disposed between respective one of the two flanges 17 of the U-shaped support member 2 and the outside face 13 of respective one of lateral portions 12 of the reinforcing square 11 of the body 1. The reinforcing square 11 is attached to the body 1 and is made up of the two lateral portions 12 linked by a connecting portion 14. Each intermediate member 4, 5 has on the inside face 21 two inclined coupling surfaces 34 which cooperate with two inclined coupling surfaces 35 on the lateral portion 12 of the reinforcing square 11. The coupling surfaces 34 and 35 are oriented in the direction of the depthwise adjustment. Each intermediate member 4, 5 has on the outside face 22 two inclined coupling surfaces 36 which cooperate with two inclined coupling surfaces 37 on the corresponding flange 17 on the support member 2. The coupling surfaces 36 and 37 are oriented in the direction of the heightwise adjustment. Each intermediate member 4, 5 further includes two abutments 24 integral with the inside face 21. The facing members 6 and 7 are disposed on the sides of the device, outside the outside faces 19 of the flanges 17 of the support member 2.

In the embodiment shown in FIGS. 2 and 4 the antirotation device includes two intermediate members 4 and 5 which are each disposed between respective one of the two flanges 17 of the U-shape support member 2 and the outside face 13 of respective one of the lateral portions 12 of the reinforcement square 11 of the body 1. Each intermediate member 4, 5 has on the inside face 21 two coupling surfaces 38 which are perpendicular thereto and cooperate with two coupling surfaces 39 perpendicular and belonging to the respective lateral portion 12 of the reinforcing square 11. The coupling surfaces 38 and 39 are oriented in the direction of the depthwise adjustment. Each intermediate member 4, 5 has on the outside face 22 two coupling surfaces 40 which are perpendicular thereto and cooperate with two coupling surfaces 41 perpendicular and belonging to respective flange 17 of the support member 2. The coupling surfaces 40 and 41 are oriented in the direction of the heightwise adjustment. Each intermediate member 4, 5 has two abutments 24 integral with the inside face 21. The facing members 6 and 7 are disposed on the sides of the device, outside the outside faces 19 of the flanges 17 of the support member 2.

Figure 5:
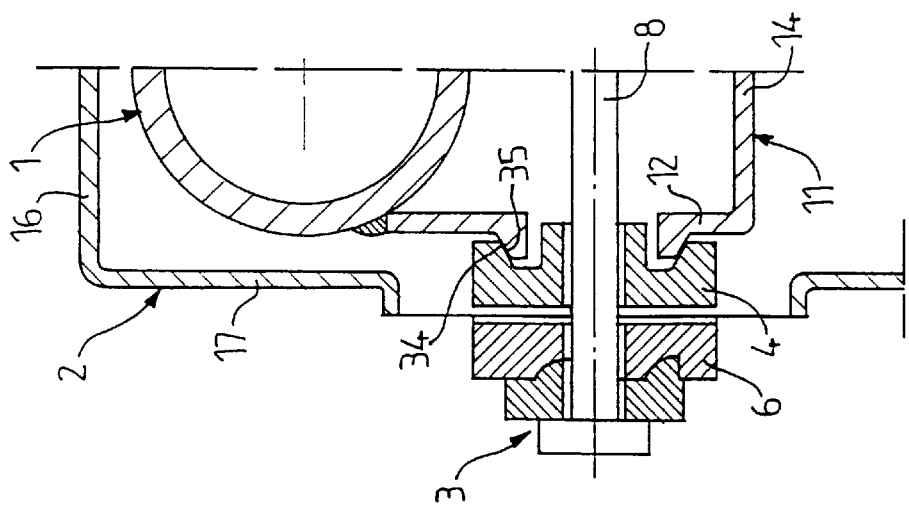
FIG. 5 repeats part of FIG. 1 for a different embodiment.

As can be seen FIG. 5, which shows a different embodiment of the intermediate member 4 or 5, the coupling surfaces 34 of the intermediate member have a female profile and the coupling surfaces 35 of the lateral member 12 of the reinforcing square 11 have a male profile. This embodiment may also be applied to steering columns with a one-way adjustment described in the remainder of this description. Accordingly, the profiles of the conjugate coupling surfaces can be male or female in the various embodiments.

The embodiment shown in FIGS. 8, 9 and 10 relates to a steering column with unidirectional depthwise adjustment.

In FIGS. 8 and 10, each flange 17 of the U-shape support member 2 has a pair of inclined coupling surfaces 26 which cooperate with a pair of inclined coupling surfaces 27 on each lateral portion 12 of the reinforcing square 11 of the body 1. The coupling surfaces 26 and 27 are oriented in the direction of the depthwise adjustment. Facing member 6 and 7 are disposed on the sides on the device, outside the outside faces 19 of the flanges 17 of the support member 2.

In the case of FIG. 9, each flange 17 of the U-shape support member 2 has a pair of coupling surfaces 30 perpendicular to the corresponding flange 17 which cooperate with a pair of coupling surfaces 31 perpendicular and belonging to each lateral portion 12 of the reinforcing square 11 of the body 1. The coupling surfaces 30 and 31 are oriented in the direction of the depthwise adjustment. Locking member 6 and 7 are disposed on the sides on the device, outside the outside faces 19 of the flanges 17 of the support member 2.

Figure 13:
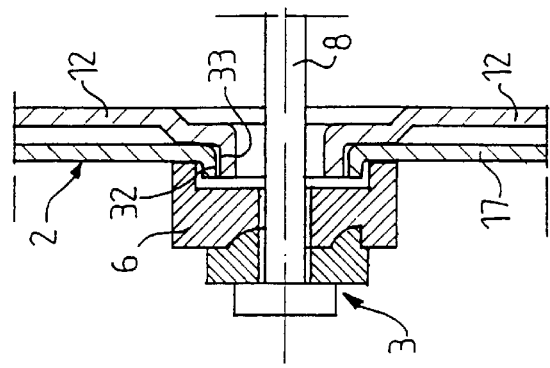
FIG. 13 repeats part of FIG. 12 corresponding to a different embodiment.
Figure 12:
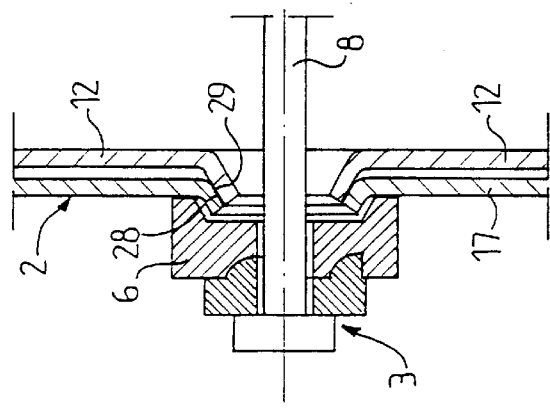
FIG. 12 is a cross-sectional view taken along the line XII—XII in FIG. 11.
Figure 11:
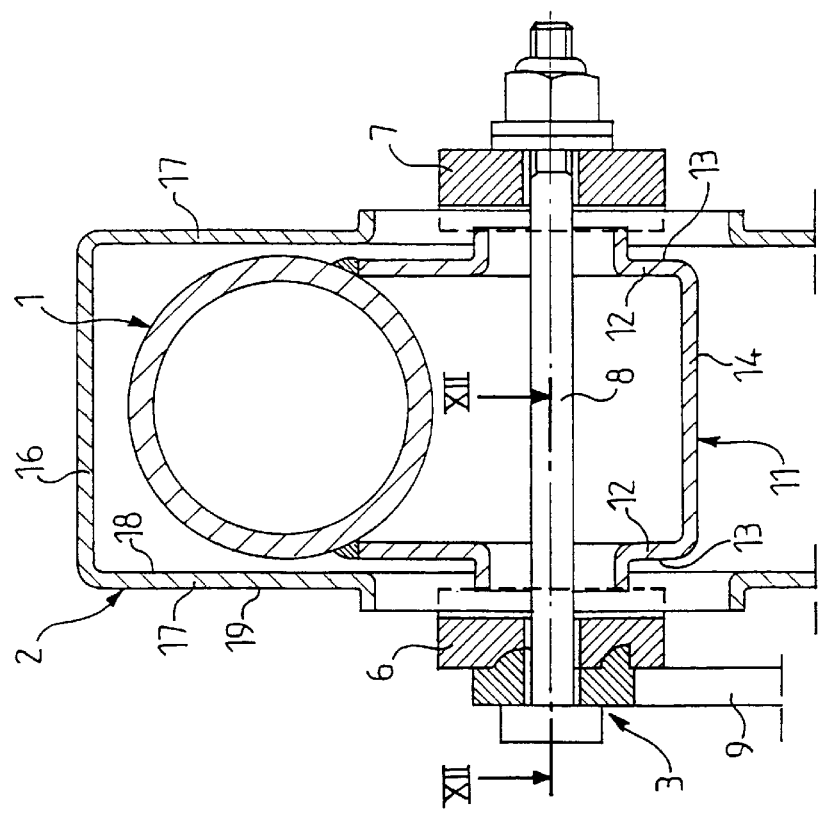
FIG. 11 is a cross-sectional view similar to FIG. 1 showing another embodiment of the invention.

In the case of FIGS. 11, 12 and 13 the antirotation device is applied to a steering column with unidirectional angular or heightwise adjustment.

In the case of FIGS. 11 and 12 each flange 17 of the U-shape support member 2 has a pair of inclined coupling surfaces 28 which cooperate with a pair of inclined coupling surfaces 29 on each lateral portion 12 of the reinforcing square 11 of the body 1. The coupling surfaces 28 and 29 are oriented in the direction of the heightwise adjustment. A facing member 6 and 7 are disposed outside the outside faces 19 of the flanges 17 of the support member 2.

In the embodiment shown in FIG. 13 each flange 17 of the U-shape support member 2 has a pair of coupling surfaces 32 which are perpendicular to the corresponding flange 17 and cooperate with a pair of coupling surfaces 33 perpendicular and belonging to the respective lateral portion 12 of the reinforcing square 11 of the body 1. The coupling surfaces 32 and 33 are oriented in the direction of the heightwise adjustment. Facing member 6 and 7 are disposed on the sides of the device, outside the outside faces 17 of the flanges 7 of the support member 2.

As appears clearly in the different figures, the coupling surfaces remain engaged with each other upon unlocking when the steering column is being adjusted in position.

What we claim is:

1. A device for preventing rotation of the steering column body of a vehicle relative to the horizontal chassis of the vehicle, comprising:
   (a) a generally U-shaped support member adapted for connection with the vehicle chassis, said support member including a pair of spaced lateral flanges;
   (b) a steering column body having a reinforcing member with two spaced lateral portions, said steering column body being adjustable in a heightwise direction and in a depthwise direction relative to the vehicle chassis; and
   (c) locking means for releasably locking said body with said support member, including a pair of spaced intermediate members arranged between said reinforcing member lateral portions and said support member flanges, respectively,
      (1) said intermediate members having inside faces provided with a pair of first coupling surfaces arranged for cooperation with a corresponding pair of second coupling surfaces on said reinforcing member lateral portions, respectively, said first and second coupling surfaces being inclined relative to said reinforcing member lateral portions and having a direction substantially parallel to a first one of the heightwise and depthwise directions, said first and second coupling surfaces being movable with respect to one another for adjusting the steering column body in the said first one of the heightwise and depthwise directions;
      (2) said intermediate members having outside faces provided with a pair of third coupling surfaces arranged for cooperation with a pair of fourth coupling surfaces carried by said support member flanges, respectively, said third and fourth coupling surfaces being inclined relative to said lateral flanges and having a direction substantially parallel to a second one of the heightwise and depthwise directions said third and fourth coupling surfaces being movable with respect to one another for adjusting the steering column body in the said second one of the heightwise and depthwise directions;
      (3) said pairs of first and third coupling surfaces being engaged and locked with the pairs of second and fourth coupling surfaces, respectively, upon locking of the steering column body by the said locking means in order to prevent rotation of steering column body, said pairs of first and third coupling surfaces remaining engaged with the pairs of second and fourth coupling surfaces, respectively, upon unlocking of the steering column body by the said locking means.

2. A device according to claim 1, wherein each of the first and third coupling surfaces is substantially parallel to an associated one of the second and fourth coupling surfaces, respectively.

3. A device according to claim 1, wherein in each pair of coupling surfaces, the coupling surfaces are symmetrical to each other.

4. A device according to claim 1, wherein the said first and second coupling surfaces extend obliquely with respect to the lateral portions of the reinforcing member.

5. A device according to claim 1, wherein the said third and fourth coupling surfaces extend obliquely with respect to the lateral flanges of the support member.

6. A device according to claim 1, wherein the locking means further comprises a pair of facing members arranged on the outside faces of the intermediate members.

7. A device according to claim 6, wherein the facing members are disposed on an axle of the locking means and are applied against an outside face of the lateral flanges of the support member.

8. A device according to claim 1, wherein the inside face of each intermediate member has two abutments extending on either side of the said first coupling surfaces, each said second coupling surface extending between one abutment and an associated first coupling surface.

* * * * *